(12) United States Patent
Kent et al.

(10) Patent No.: US 8,250,530 B2
(45) Date of Patent: Aug. 21, 2012

(54) COMPOSITE VALUES FOR DECLARATIVE LANGUAGE APPLICATIONS

(75) Inventors: Simon David Kent, Redmond, WA (US); William Emeric Aitken, Mercer Island, WA (US); Siddharth Jayadevan, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 756 days.

(21) Appl. No.: 12/472,834

(22) Filed: May 27, 2009

(65) Prior Publication Data

US 2010/0306740 A1   Dec. 2, 2010

(51) Int. Cl.
G06F 9/44   (2006.01)
(52) U.S. Cl. .............. 717/117; 717/125; 717/162
(58) Field of Classification Search .................. None
See application file for complete search history.

(56) References Cited

U.S. PATENT DOCUMENTS

| | | | |
|---|---|---|---|
| 7,073,170 B2 * | 7/2006 | Grier et al. | 717/162 |
| 7,165,239 B2 | 1/2007 | Hejlsberg | |
| 7,437,710 B2 | 10/2008 | Bau | |
| 7,716,644 B2 * | 5/2010 | Horton et al. | 717/125 |
| 7,779,388 B2 * | 8/2010 | Ringseth et al. | 717/117 |
| 7,913,231 B2 * | 3/2011 | Stienhans et al. | 717/125 |
| 2004/0010776 A1 * | 1/2004 | Shah | 717/117 |
| 2004/0083454 A1 * | 4/2004 | Bigus et al. | 717/117 |
| 2005/0022164 A1 | 1/2005 | Takacsi-Nagy | |
| 2005/0155027 A1 * | 7/2005 | Wei | 717/162 |
| 2005/0166196 A1 * | 7/2005 | Grier et al. | 717/162 |
| 2005/0246686 A1 * | 11/2005 | Seshadri et al. | 717/117 |
| 2006/0059461 A1 | 3/2006 | Baker | |
| 2006/0089941 A1 | 4/2006 | Jenni | |
| 2006/0248112 A1 | 11/2006 | Williams | |
| 2006/0248448 A1 | 11/2006 | Williams | |
| 2006/0248451 A1 | 11/2006 | Szyperski | |
| 2008/0052687 A1 | 2/2008 | Gonzales-Tuchmann | |
| 2009/0070786 A1 | 3/2009 | Alves | |
| 2010/0017788 A1 * | 1/2010 | Bronkhorst et al. | 717/125 |

OTHER PUBLICATIONS

IBM, Composite Applications in Notes—Benefits and Technical Overview, 2008, pp. 21-24 and 43-48.*
Terry Coatta, Distributed Configuration Management Using Composite Objects and Constraints, 1992, pp. 3-10.*
Bruce Lucas, A Declarative Programming Model for Compositional Development and Evolution of Cross-Organizational Applications, Collage Dublin Workshop Paper, 2007, pp. 2-5.*
Alpuente; "Automated Specification and Verification of Web Sites"; First International Workshop '05; Mar. 14-15, 2005; Valencia, Spain; pp. 1-207; http://users.dsic.upv.es/workshops/wwv05/pre-proceedings.pdf.
Learnerplates; "Learnerps dotNET"; Nov. 12, 2008; pp. 1-49; http://learnerps-dotnet.blogspot.com/.

* cited by examiner

*Primary Examiner* — Thuy Dao
*Assistant Examiner* — Mongbao Nguyen
(74) *Attorney, Agent, or Firm* — Workman Nydegger

(57) ABSTRACT

One embodiment is directed to a method that may be practiced in a declarative application with composites organized hierarchically, including composites in the same hierarchy, but not directly related by direct intervening child/parent relationships. The method includes acts for providing a link between composites unrelated by direct intervening child/parent relationships. The method includes rendering data at a user interface. The data is associated with a first composite in a declarative application. The method further includes detecting, at the user interface, user interaction with the rendered data. As a result of detecting user interaction with the rendered data, the method further includes defining a composite path to the first composite. The method further includes providing the name of the path as a local variable to a second composite such that the second composite can interact with the data.

18 Claims, 2 Drawing Sheets

COMPOSITE VALUES FOR DECLARATIVE LANGUAGE APPLICATIONS

BACKGROUND

Background and Relevant Art

Computers and computing systems have affected nearly every aspect of modern living. Computers are generally involved in work, recreation, healthcare, transportation, entertainment, household management, etc.

Computer programming can take any one of a number of different forms. For example, computer programs are often written using imperative code that specifically commands certain functions to be performed. Some examples of higher level imperative code include Visual Basic® (VB), C#, etc. Some lower level imperative languages, such as assembly languages, may directly command computer hardware to perform certain functions. For example, at a very low level, instructions can apply to moving bits directly into registers on a processor.

In contrast to imperative programming, some relatively new programming techniques use declarative programming, that instead of commanding computer hardware to perform certain functions, certain results are specified. Underlying the declarative statements is imperative code that directs computer hardware to perform the commands to accomplish the desired results, but declarative programmers do not generally develop the imperative code. Rather, a developer can code imperative code for declarative elements, which a declarative code programmer can then use to create a declarative program.

When authoring data driven declarative applications, such as a XAD application, a programmer uses functional composition to connect and configure graphs of objects. Each function builds a graph of objects and exposes a subset of those objects as return values, allowing any calling function to compose the return values in its own graph. Under this scheme, any object that needs to be composed with another object must be explicitly returned by a function and directly composed by the caller. This scheme generally works well for the primary composition axis of an application (such as UI elements) that are typically composed into hierarchies via parent/child relationships.

However, loosely coupled composition scenarios, where objects built in non-contiguous parts of the hierarchy need to be composed in a dynamic fashion, are not well-supported by this scheme. In order to support such scenarios programmers are forced to use unnatural and non-performant solutions, such as changing the primary composition axis of the application to include all objects that may potentially be loosely-bound or adopting non-data-driven solutions that operate outside the language.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment is directed to a method that may be practiced in a declarative application with composites organized hierarchically, including composites in the same hierarchy, but not directly related by direct intervening child/parent relationships. The method includes acts for providing a link between composites unrelated by direct intervening child/parent relationships. The method includes rendering data at a user interface. The data is associated with a first composite in a declarative application. The method further includes detecting, at the user interface, user interaction with the rendered data. As a result of detecting user interaction with the rendered data, the method further includes defining a composite path to the first composite. The method further includes providing the name of this path as a local variable to a second composite such that the second composite can interact with the data. The second composite is in the same declarative application hierarchy as the first composite but is not related to the first composite by any direct intervening child/parent relationships.

Another complementary embodiment includes a method practiced in a declarative application with composites organized hierarchically, including composites in the same hierarchy, but not directly related by direct intervening child/parent relationships. The method includes acts for using a link between composites unrelated by direct intervening child/parent relationships. The method includes accessing a first composite that can interact with data. The method further includes evaluating a local variable at the first composite. The local variable includes the name of a composite path to a second composite, and to data associated with the second composite. The data associated with the second composite is the data that can be interacted with by the first composite. The second composite is in the same declarative application hierarchy as the first composite but is not related to the first composite by any direct intervening child/parent relationships. The method further includes, using the first composite, interacting with the data associated with the second composite.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1A:
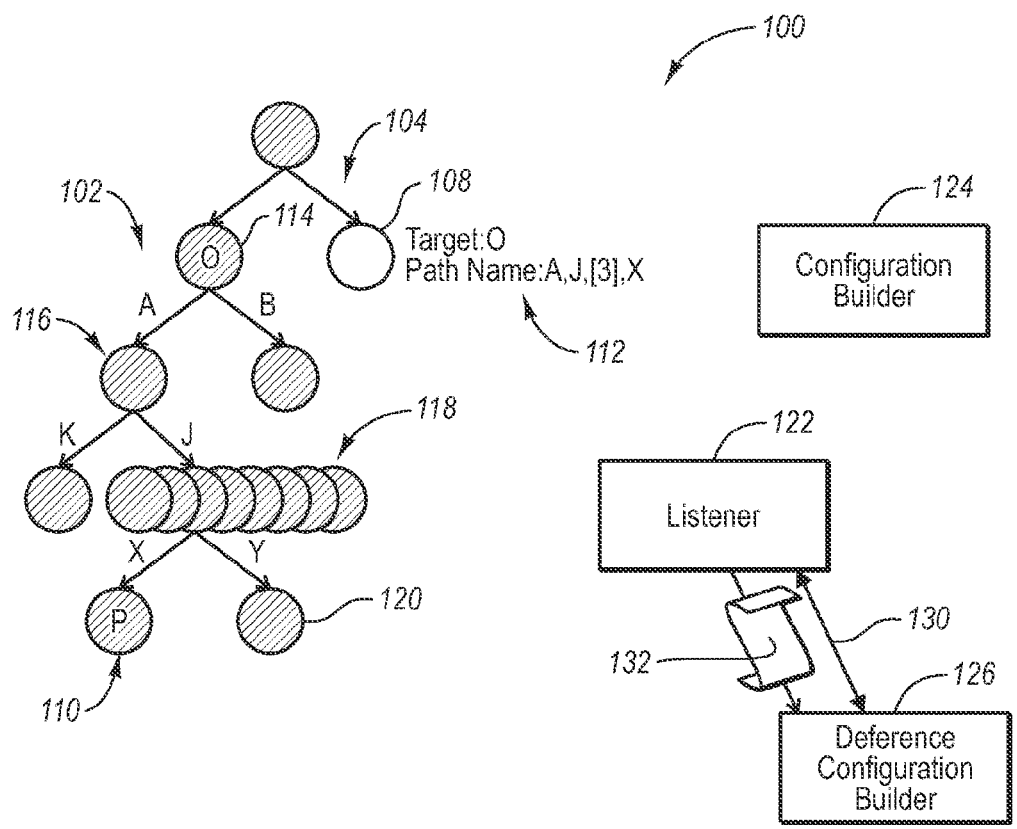
FIG. 1A illustrates a declarative application hierarchy.

Declarative applications can be structured as trees of domains. A domain is a declarative group of objects that may sometimes be referred to herein as a composition of objects or simply as a composition. Generally, a composition can be formed by a configuration builder to include the constituent objects. Once built, the composition will generally return an object as a primary return value, but the other objects in the composition are generally closed to outside access. Specialized compositions can be created, which are referred to herein as composites. A composite includes additional functionality in that the composite includes an interface which allows other agents to query the composite, using the primary return value, about objects in the composite.

As noted previously, in some declarative applications, domains may be organized such that it is difficult for different domains to interact with one another. For example, referring to FIG. 1A, a tree 100 of domains is illustrated. The tree 100 of FIG. 1A includes a sub-tree 102 and a second sub-tree 104. A domain 108 in the second sub-tree 104 may have need to obtain data or call functions in another domain 110 in the first sub-tree 102. However, because the domains 108 and 110 are in different sub-trees in that neither is an ancestor of the other, or because the domains are loosely bound in that they are separated by a number of other domains, it may be difficult for the domain 108 to obtain data or call functions in the domain 110.

Some embodiments include functionality for associating secondary or potentially loosely bound values with a primary return value of a function via names or indices, to create a composite. Discovery of loosely bound objects is then made possible by navigating the secondary composition axis of a declarative application, starting from a primary composition value and using a data-specified path, taking appropriate dependencies whenever a configuration decision is navigated.

For example, FIG. 1A illustrates that local data 112 specifying a target and the name of a path to a domain 110 is included in the domain 108. This path can be used to quickly access data or functions at the domain 110. The tree 100 includes a number of compositions built by switch and/or repeater configuration builders, illustrated generally by configuration builder 124. Other embodiments may include compositions built by invokers or other configuration builders. As noted, compositions are built by a configuration builder 124. A switch configuration builder includes functionality for selecting a sub-case from among a plurality of sub-cases. A repeater configuration builder applies one or more operations to data elements in a data collection, by applying the same operations to each data element in the data collection in each their own turn thus creating one or more sub-domains for each data element. An invoker simply invokes a dynamically selected function to create a domain.

The local data 112 specifies a domain 114 built by a switch as a target. From the domain 114, the local data 112 contains the name of a path including a decision A of the domain 114 to another domain 116 built by a switch. The path further specifies a decision J to a plurality of domains 118 built by a repeater. The path further specifies the third domain in the plurality of domains 118. From, the third domain in the plurality of domains 118, the path specifies a decision X to a destination domain 110 built by a switch.

The path can be obtained by using functionality implemented in the configuration builders 124 used to build the domains. In particular, a configuration builder has access to the path of its parent domain, and is aware of the run time decisions it made when building its target domain. The path of its target domain comprises its parent path followed by a record of its dynamic decisions. The configuration builders 124 can track dependencies when building domains.

A dereference configuration builder 126 can be used to dereference a path name to discover secondary composition values.

Embodiments may also include functionality for dependency tracking. Dependency tracking is described in more detail in conjunction with the description of FIG. 5 of U.S. patent application Ser. No. 11/360,856 filed on Feb. 23, 2006, which is incorporated herein by reference in its entirety. In particular, a listener 122 is a computer agent which monitors an application or group of applications for certain events. A listener 122 may monitor certain registered objects' data within an application for a change in value. Objects and their data are registered with such a listener 122, such as for example, by a dereference configuration builder 126 registering with a listener 122. When a change in a data value occurs within a registered object, a change notification is received by the dereference configuration builder 126 from the listener 122. This change notification can cause the dereference configuration builder to retrace the path to named by the local data 112 when changes to dependencies occur. This may result in a new value being observed.

Illustrating now a concrete example, one domain, such as domain 110 may be used for implementing some element of a word processing document, such as a page, paragraph, word, table, or some other element. Another domain, such as domain 108 may be used to implement a user interface for applying formatting or other actions on the element of the word processing document. The display of the user interface may be affected by the state of the domain 110 for the word processing document element. For example, certain options of the user interface may be grayed out if those options do not make sense according to the context of the word processing document element. To determine the state, the domain 108 may need to get data or invoke a function from the domain 110. In declarative programming applications, when the domains are loosely coupled by having a number of intervening domains or by being in a different sub-tree, it may be difficult to provide the appropriate linkage. However, by including a path name as local data 112 at the domain 108, the linkage can be more readily obtained by providing the path name to a dereference configuration builder which can then dereference the path.

Notably, domains can be created and/or destroyed such that a path name stored as local data 112 may no longer refer to an active configuration path. In this case, the value observed by the dereference configuration builder is now empty. Thus, a dependency tracker can be used to update this value as appropriate. For example, if the domain 110 is used to implement a table in a document, and the name of a path to this domain is stored in the local 112, and the table (and hence domain 110) is then later removed from the document, the value observed by domain 108 using this path name will change.

Alternatively, if the table implemented by the domain 110 is replaced with a paragraph implemented by the domain 120, the code implementing the UI action that causes this change might also update the path name in the local data 112 to reflect this change. E.g. the path name may be updated to A,J,[3],Y.

Because the path has changed, the dereference algorithm is re-run to obtain a new observed value. This can be accomplished in one embodiment by a listener notifying a dereference configuration builder 126, which can then rerun a path dereference algorithm to calculate the appropriate value.

Embodiments may be applied to any one of a number of declarative programming frameworks. However, some of the embodiments described herein are illustrated by example using an XML application framework (XAF) such as is described in U.S. patent application Ser. No. 11/360,448 filed on Feb. 23, 2006, which is incorporated herein by reference in its entirety.

As with the application illustrated in FIG. 1A, an XAF application is defined as a tree of domains. A domain is a declarative group of objects that may sometimes be referred to herein as a composition of objects or simply as a composition. An example tree has been illustrated in FIG. 1A.

In the present example, and as noted above, a domain is built by a configuration builder 124 by running declarative language code. Such declarative language code, in the XAF example, may be XAF Application Definition (XAD) or Dynamic XAD code. The declarative language code is described in more detail in U.S. patent application Ser. No. 11/360,856 filed on Feb. 23, 2006, which is incorporated herein by reference in its entirety.

While some embodiments have currently been implemented as part of the XAD language, embodiments could be implemented in any data-driven, declarative language that manages lifetime and configuration of objects using rules driven by application state.

Additional examples and details are now illustrated. In one embodiment, as previously noted, a language construct, called a composite, allows a programmer to associate a primary composition value with a set of named secondary composition values, called components.

A language construct, called a composite dereference, allows a programmer to discover secondary composition values using a primary value as a starting target, and a dereference path, which describes how to search for secondary values. For example, as illustrated in FIG. 1A, the primary value target is "O" (i.e. domain 114) and the dereference path is A,J,[3],X. The dereference path is a sequence of steps. The steps may include, for example, names and/or keys (including indices).

Keys are used to navigate the primary axis, which comprises the domain hierarchy, and the associated primary return values (the UI hierarchy). Thus to refer to the domain 118 in FIG. 1A, the path A, J which contains only the indexes A and J is used. To refer to the primary return value of the domain 110, that is, its root UI element, the path A, J, [3], X that contains indexes A, J, X and the key [3] is used. Whether a given path refers to a domain or its primary return value depends on the context in which it is used.

Names are used to navigate the secondary axis. Suppose that in addition to providing their primary return value, domains wish to expose a secondary value, for example, their current selection state. Such domains implement a composite. Each composite, in addition to its principal return value, also provides access to a set of named secondary return values. To access such values, paths may include names. For example if the domain 110 in FIG. 1A were a composite that exposed its current selection using the name Selection, the path A, J, [3], X, Selection could be used to access the current selection of 110.

Because the application is being composed from loosely coupled components, components may rewire dynamic checks to ensure that when they dereference paths, they obtain values of the expected type. A guard is included on the dereference to ensure that it will only return values of the expected type and/or cardinalty.

In one embodiment, when a composite is created by the runtime, a configuration builder 124 is created to associate the primary value with the secondary component values. Similarly, when a composite dereference is created by the runtime, a dereference configuration builder 126 is created to perform the dereference.

A dereference for a given observed path, and a given observed configuration target, is performed in steps, one for each step in the path sequence. For component name steps, the dereference searches from the target for a composite, and if successful, looks for a named component. For indexed steps, the dereference searches from the target for an indexed runtime value, and if successful, looks up the indexed value. If any step fails, the dereference fails, and the composite dereference will be observed to have an "empty" value. If any step is successful, the result of the step becomes the current target for the next step. If all steps are successful, the composite deference will be observed to have the result of the final step.

The composite deference configuration builder 126 is responsible for registering dependencies on the provided path with a listener, such as the listener 122 illustrated in FIG. 1A, and on each runtime value it observes while performing dereference steps. Registration is illustrated at 130 of FIG. 1A. The composite dereference configuration builder 126 is notified by the listener 122, as illustrated by the notification 132, when either the path or the observed runtime values change, and automatically reruns the path dereference algorithm to calculate a new observable value.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Figure 1B:
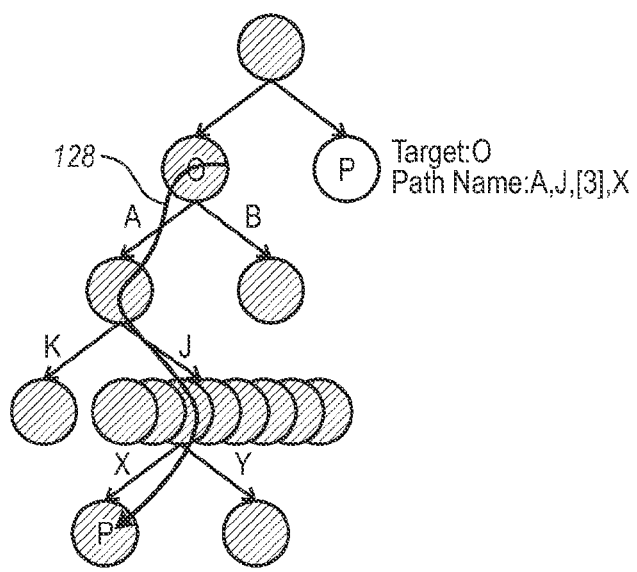
FIG. 1B illustrates a target and path for a declarative application hierarchy.
Figure 2:
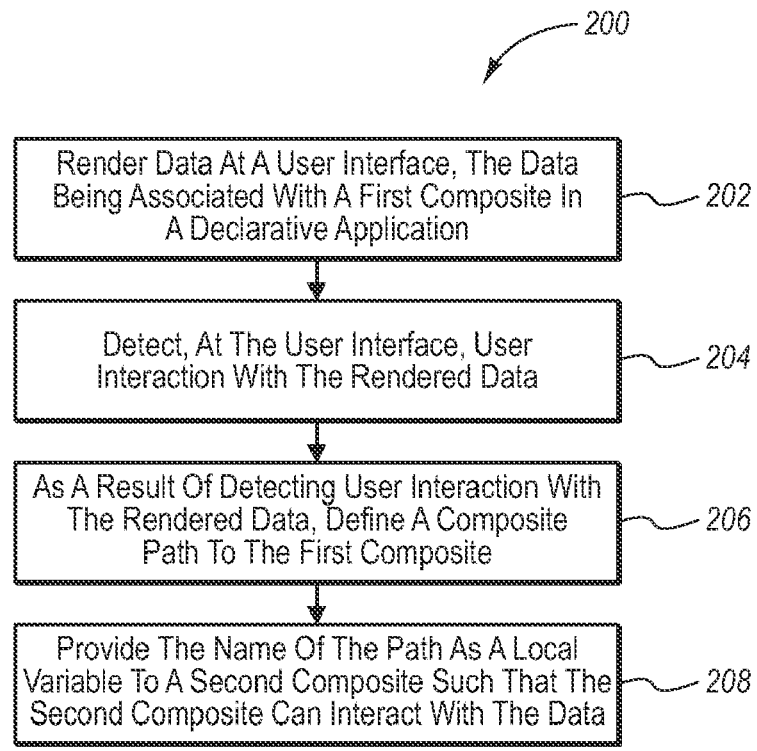
FIG. 2 illustrates a method of providing a link between composites.

Referring now to FIG. 2, a method 200 is illustrated, which may be practiced in a declarative application with composites organized hierarchically. For example, the composites may be in the same hierarchy, but not directly related by direct intervening child/parent relationships. The method includes acts for providing a link between composites unrelated by direct intervening child/parent relationships. The method includes rendering data at a user interface, the data being associated with a first composite in a declarative application (act 202). For example, with reference to FIG. 1, a composite 110 may be associated with data that is displayed at a user interface.

The method 200 further includes detecting, at the user interface, user interaction with the rendered data (act 204). For example, the user interface may detect selection of the data, viewing of the data, changes to the data, creation of the data, etc.

As a result of detecting user interaction with the rendered data, the method 200 further includes defining a composite path to the first composite (act 206). For example, a path from the composite 114 to the composite 110 may be defined.

The method 200 further includes providing the name of the path as a local variable to a second composite such that the second composite can interact with the data (act 208). FIG. 1 illustrates the local data 112 including a path name.

As noted, embodiments may be implemented where the second composite is in the same declarative application hierarchy as the first composite but is not related to the first composite by any direct intervening child/parent relationships such that the first and second composites are in different sub-trees of the same hierarchical declarative application. An example of this is illustrated in FIG. 1, where a composite 110 is in a first sub-tree 102 and the composite 108 is in a second sub-tree 104.

The method 200 may further include creating a configuration builder to perform the act of defining a composite path. For example, FIG. 1 illustrates a configuration builder 124 used to define the composite path.

The method 200 may be practiced where the path includes a sequence of names and/or keys including indices. In this case, the path comprises the path of the parent domain, followed by the index or key of the current domain relative to the parent domain, followed by the Name, if any, of the referenced value.

Figure 3:
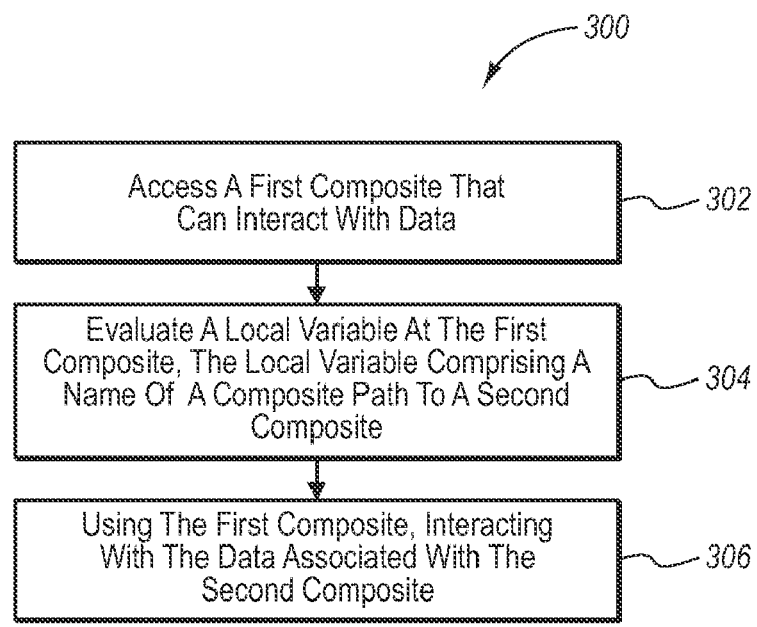
FIG. 3 illustrates a method of using a link between composites.

Referring now to FIG. 3, a complementary method 300 is illustrated. The method 300 may be practiced in a declarative application with composites organized hierarchically, including composites in the same hierarchy, but not directly related by direct intervening child/parent relationships. The method 300 includes acts for using a link between composites unrelated by direct intervening child/parent relationships. The method includes accessing a first composite that can interact with data (act 302). For example, the composite 108 may include functionality for interacting with data. In the examples illustrated above, composite may implement, for example, a user interface element that controls how data can be interacted with or displayed.

The method 300 further includes evaluating a local variable at the first composite (act 304). For example, the local variable may include the name of a composite path (such as the composite path illustrated in the user data 112) to a second composite, and thereby to data associated with the second composite. The data associated with the second composite is the data that can be interacted with by the first composite. For example, the composite 110 may have data that can be interacted with by the composite 108. In this example, the second composite is in the same declarative application hierarchy as the first composite but is not related to the first composite by any direct intervening child/parent relationships.

The method 300 further includes using the first composite, interacting with the data associated with the second composite. For example, by following the target and the composite path named by the local data 112, the composite 108 can interact with the data at the composite 110.

The method 300 may further include creating a dereference configuration builder at runtime to dereference the composite path name. For example, the dereference configuration builder 126 may be built at runtime to dereference the composite path name in the local data 112. Some embodiments may further include registering dependencies on the composite path with a listener, by registering the dereference configuration builder with the listener, receiving, at the dereference configuration builder, a notification from the listener that dependencies in the path have changed; and as a result of dependencies in the composite path changing, updating the observed value. Dependencies in the path may change, for example, as a result of the path itself changing. In some such examples, updating the path may include the dereference configuration builder rerunning a path dereference algorithm to calculate a new path. In an alternative example, dependencies in the path may change as a result of observed runtime values changing. In some such examples, updating the path may include the dereference configuration builder rerunning a path dereference algorithm to calculate a new observable value Some embodiments of the method 300 may further include: for component name steps in the composite path, searching from a target domain for a composite, finding a composite from the target, and searching for a name component of the composite.

Some embodiments of the method 300 may further include: for index steps in the composite path, searching from a target domain for an indexed runtime value, finding an indexed runtime value, and looking up the indexed value.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical storage media and transmission media.

Physical storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to physical storage media (or vice versa). For example, computer-executable instructions or data structures received over a network or data link can be buffered in RAM within a network interface module (e.g., a "NIC"), and then eventually transferred to computer system RAM and/or to less volatile physical storage media at a computer system. Thus, it should be understood that physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a declarative application with composites organized hierarchically, including composites in the same hierarchy, but not directly related by direct intervening child/parent relationships, a method executable by a processor of providing a link between composites unrelated by direct intervening child/parent relationships, the method comprising:
    rendering data at a user interface, the data being associated with a first composite in the declarative application;
    detecting, at the user interface, user interaction with the rendered data,
    as a result of detecting user interaction with the rendered data, defining a composite path to the first composite;
    providing the path as a local variable to a second composite such that the second composite can interact with the data;
    wherein the second composite is in the same declarative application hierarchy as the first composite but is not related to the first composite by any direct intervening child/parent relationships such that the first and second composites are in different sub-trees of the same hierarchical declarative application;
    registering dependencies on the composite path with a listener, by registering a configuration builder with the listener;
    receiving at the configuration builder a notification from the listener that dependencies in the path have changed; and
    as a result of dependencies in the composite path changing, updating the observed value of the path.

2. The method of claim 1, further comprising creating the configuration builder to perform the act of defining a composite path.

3. The method of claim 1, wherein the path has a name consisting of a sequence of names and/or keys including indices.

4. The method of claim 1, further comprising:
    registering dependencies on the composite path name itself with a listener;
    receiving a notification from the listener that the path name itself has changed; and
    as a result of dependencies in the composite path changing, updating the observed value of the path.

5. The method of claim 4, wherein:
    registering dependencies on the composite path comprises registering a dereference configuration builder with the listener; and
    updating the observed value comprises the dereference configuration builder rerunning a path dereference algorithm to calculate a new path.

6. The method of claim 1, wherein dependencies in the path change as a result of observed runtime values changing.

7. The method of claim 6, wherein:
    registering dependencies on the composite path comprises registering a dereference configuration builder with the listener; and
    updating the path comprises the dereference configuration builder rerunning a path dereference algorithm to calculate a new observable value.

8. In a declarative application with composites organized hierarchically, including composites in the same hierarchy, but not directly related by direct intervening child/parent relationships, a method executable by a processor of using a link between composites unrelated by direct intervening child/parent relationships, the method comprising:
    accessing a first composite that can interact with data;
    evaluating a local variable at the first composite, the local variable comprising a composite path to a second composite, and to data associated with the second composite, the data associated with the second composite being the data that can be interacted with by the first composite, wherein the second composite is in the same declarative application hierarchy as the first composite but is not related to the first composite by any direct intervening child/parent relationships,
    using the first composite, interacting with the data associated with the second composite;
    registering dependencies on the composite path with a listener, by registering the dereference configuration builder with the listener;
    receiving, at the dereference configuration builder, a notification from the listener that dependencies in the path have changed; and
    as a result of dependencies in the composite path changing, updating the observed value of the path.

9. The method of claim 8, further comprising creating the dereference configuration builder at runtime to dereference the composite path.

10. The method of claim 8, wherein dependencies in the path change as a result of the path name itself changing.

11. The method of claim 10, wherein updating the path comprises the dereference configuration builder rerunning a path dereference algorithm to calculate a new path.

12. The method of claim 8, wherein dependencies in the path change as a result of observed runtime values changing.

13. The method of claim 12, wherein updating the path comprises the dereference configuration builder rerunning a path dereference algorithm to calculate a new observable value.

14. The method of claim 8, further comprising:
for component name steps in the composite path, searching from a target domain for a composite;
finding a composite from the target; and
searching for a name component of the composite.

15. The method of claim 8, further comprising:
for index steps in the composite path, searching from a target domain for an indexed runtime value,
finding an indexed runtime value, and
looking up the indexed value.

16. In a declarative application with composites organized hierarchically, including composites in the same hierarchy, but not directly related by direct intervening child/parent relationships, a computer program product comprising a computer readable memory comprising computer executable instructions that when executed by a processor cause the following to be performed:
rendering data at a user interface, the data being associated with a first composite in the declarative application, wherein the first composite includes functionality including an interface which allows other agents to query the first composite, using a primary return value of the first composite, about objects in the composite;
detecting, at the user interface, user interaction with the rendered data,
as a result of detecting user interaction with the rendered data, defining a composite path to the first composite;
providing the path as a local variable to a second composite such that the second composite can interact with the data;
wherein the second composite is in the same declarative application hierarchy as the first composite but is not related to the first composite by any direct intervening child/parent relationships such that the first and second composites are in different axis of the same hierarchical declarative application;
registering dependencies on the composite path with a listener, by registering the dereference configuration builder with the listener;
receiving, at the dereference configuration builder, a notification from the listener that dependencies in the path have changed; and
as a result of dependencies in the composite path changing, updating the observed value of the path.

17. The computer program product of claim 16, further comprising creating a configuration builder to perform the act of defining a composite path.

18. The method computer program product of claim 16, wherein the path comprises a sequence of names and/or keys including indices.

* * * * *